March 4, 1969  A. M. FERRARI  3,430,749
LUMBER STRIP OFF-BEARER AND LOADER
Filed June 9, 1967  Sheet 1 of 5

INVENTOR
Arthur M. Ferrari
By Webster & Webster
ATTORNEYS

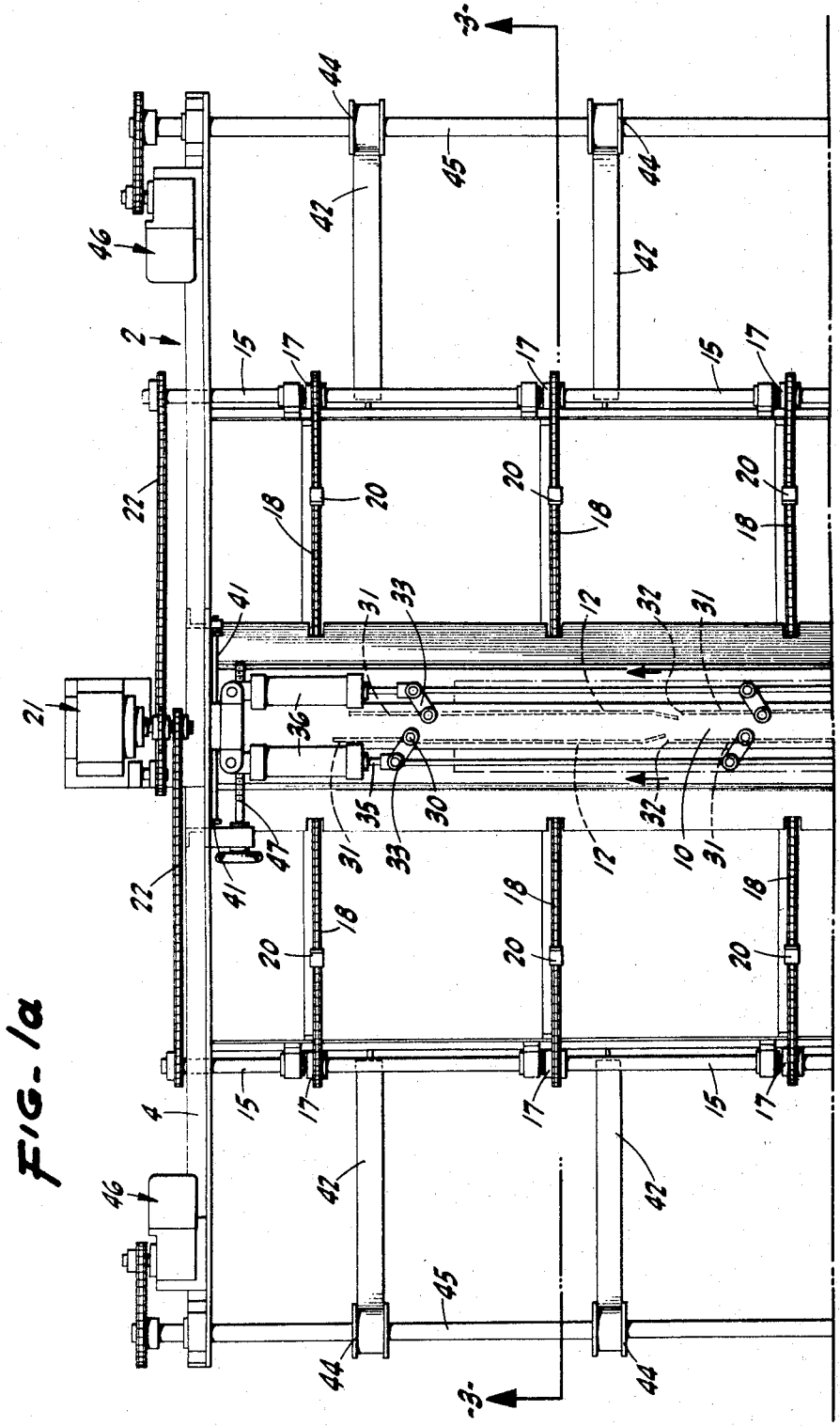

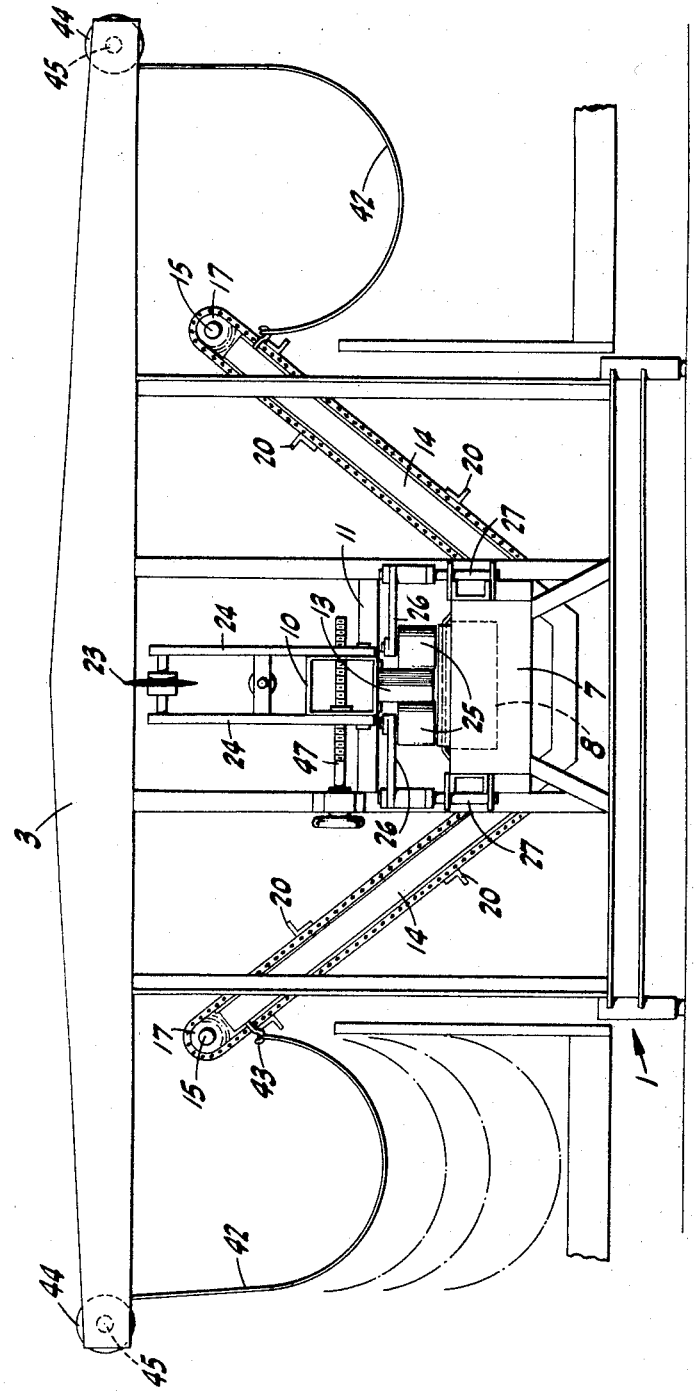

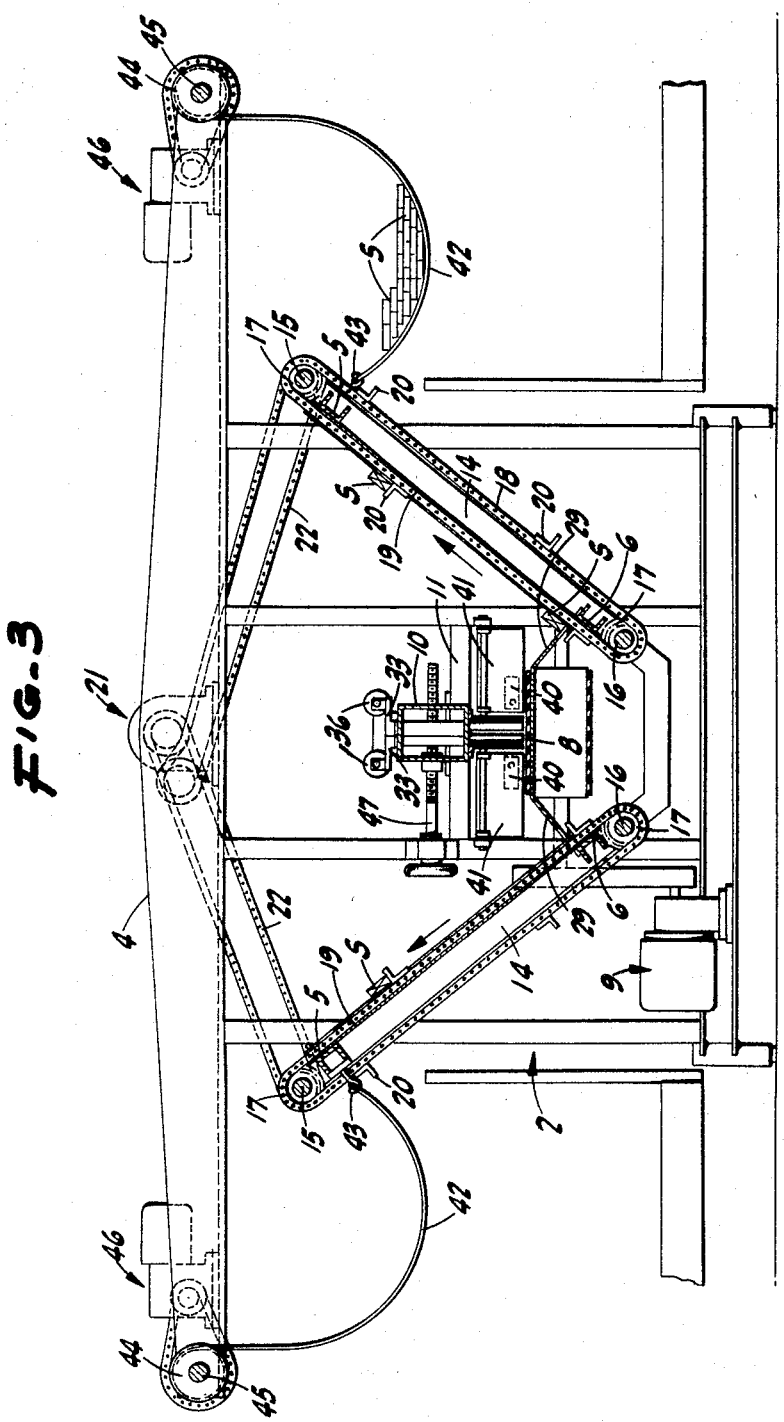

United States Patent Office 3,430,749
Patented Mar. 4, 1969

3,430,749
LUMBER STRIP OFF-BEARER AND LOADER
Arthur M. Ferrari, P.O. Box 315,
Corning, Calif. 96021
Filed June 9, 1967, Ser. No. 645,047
U.S. Cl. 198—24                          7 Claims
Int. Cl. B65g 47/26, 57/00

ABSTRACT OF THE DISCLOSURE

A lumber strip off-bearer and loader arranged to receive and widely laterally separate longitudinally sawed lumber strips fed to a predetermined point in side-by-side relation from a saw or a strip pre-separator unit to which the saw delivers; the apparatus being operative to accumulate stacks of such widely laterally separated strips and deposit the same on alongside pallets or trucks.

---

The apparatus of the present invention is especially adapted, but not limited, for use in the molding manufacturing industry, and particularly in association with a resaw which produces strips from which molding is milled.

Background of the invention

It is a common practice, in the industry, for the lumber strips—as fed side-by-side from a saw—to be received therefrom on a table or conveyor from opposite sides of which operators manually grasp the strips and then turn and deposit the strips on alongside pallets or trucks. Such manual handling of the strips is not only tedious to the operators, but also is high in labor cost. However, this practice has been continued for the reason that previous mechanical apparatus developed for the purpose has not been wholly effective or practical in operation.

Summary of the invention

The present invention provides, as a major object, a lumber strip off-bearer and loader which embodies—with a horizontal endless driven conveyor belt onto which the side-by-side strips are fed—novel mechanism which functions automatically, when the conveyor belt-supported strips reach a predetermined point, to discharge the strips from opposite sides of the conveyor belt and widely laterally separate such discharged strips, and then accumulate the same in stacks for deposit on an adjacent pallet or truck.

The present invention provides, as another object, a lumber strip off-bearer and loader, as above, wherein said mechanism includes—at each side of the conveyor belt and in position to receive the strips discharged therefrom—elevator means to move said discharged strips to a relatively high and further laterally outward position which enables such strips to be accumulated above and deposited on the adjacent pallet or truck.

The present invention provides, as still another object, a longitudinally extending sling at each side of the apparatus in position to receive and accumulate the lumber strips which fall from the upper end of the related elevator means; each such sling being arranged for power-controlled lowering in a manner to progressively increase its depth as a stack of lumber strips accumulates therein, and to deposit such stack on a pallet or truck floor supported beneath such sling.

The present invention provides, as an additional object, a deflector arranged so that the side-by-side lumber strips as fed to the apparatus are delivered simultaneously onto the belt on opposite sides of a longitudinal fence or partition included in the apparatus and supported close to but above the belt; the deflector being at the front end of said fence or partition and both—as a unit—being adjustable laterally as may be necessary to aline the same with the longitudinal saw line of the lumber strips as so fed.

The present invention provides, as a further object, a lumber strip off-bearer and loader which is designed for ease and economy of manufacture, and automatic trouble-free operation.

The present invention provides, as a still further object, a practical, reliable, and durable lumber strip off-bearer and loader and one which is exceedingly effective for the purpose for which it is designed.

Brief description of the drawings

FIG. 1a is a top plan view of the rear end portion of the apparatus.

FIG. 2 is a transverse elevation of the apparatus at its entry end.

FIG. 3 is a cross section on line 3—3 of FIG. 1a.

Description of the preferred embodiment

Figure 1:
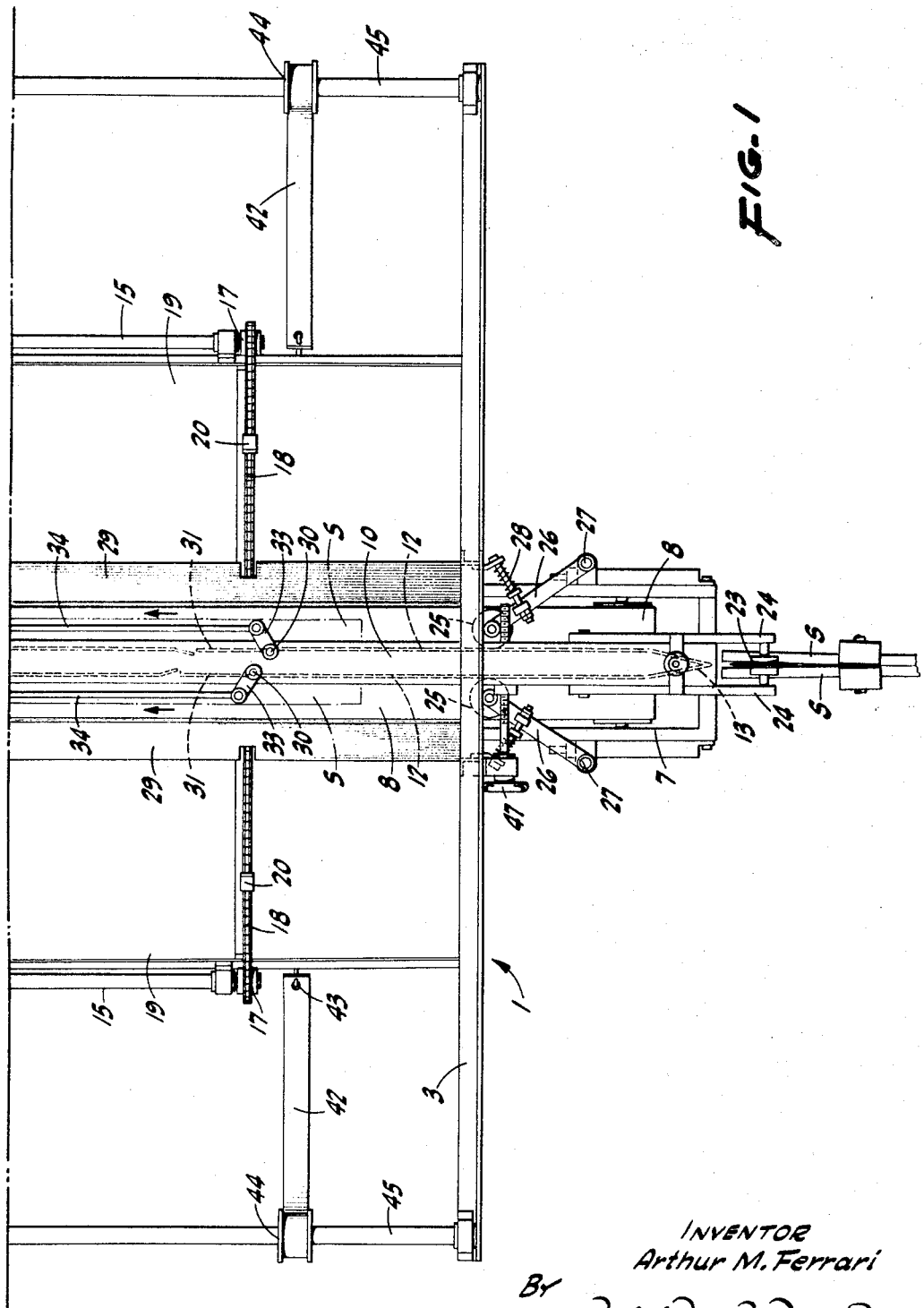
FIG. 1 is a top plan view of the front or entry end portion of the off-bearer and unloader, partly broken away.
Figure 4:
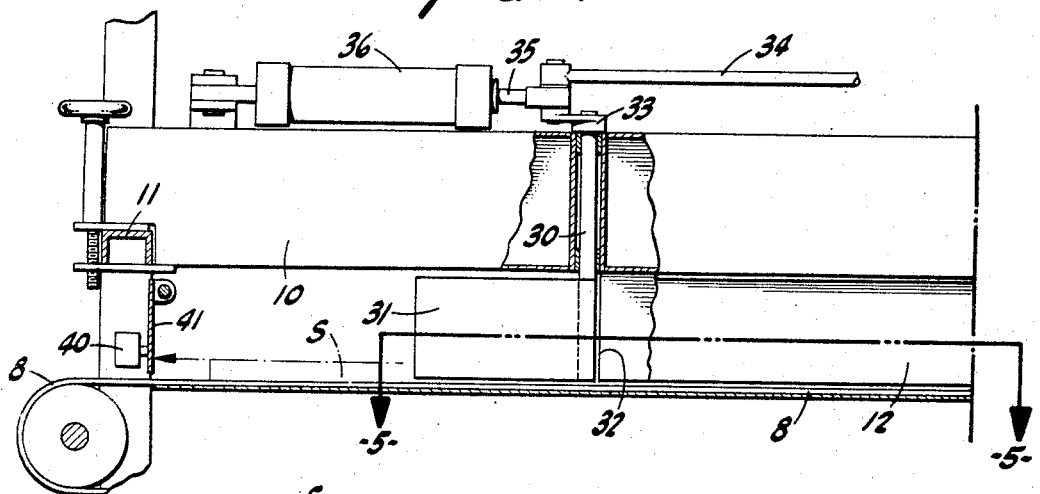
FIG. 4 is a fragmentary enlarged longitudinal elevation of the lumber strip sweeping mechanism, shown in a normal retracted position and partly broken out and in section.

Referring now more particularly to the drawings and to the characters of reference marked thereon, the apparatus comprises generally duplicate front and rear upright transverse frames 1 and 2 including relatively heavy-duty, elongated top beams 3 and 4, respectively. The frames 1 and 2 are connected at intervals by widely spaced longitudinal upper beams 5 and by somewhat closer spaced longitudinal lower beams 6; the beams 5 being at a level a short distance below the top beams 3 and 4.

The front frame 1 includes a relatively short and narrow horizontal and centrally located extension 7 disposed adjacent the level of the lower beams 6. Suitably supported from the frame extension 7 and from the rear frame 2, and extending the full distance therebetween, is a relatively wide lumber strip conveying belt 8, the upper run at least of which is horizontal. This belt is driven at its rear end, and so that the upper run thereof moves from front to rear at a suitable speed, by means of a frame-supported electric motor unit 9.

Disposed some distance above the belt 8, and extending for the full length thereof and parallel thereto, is a rectangular preferably hollow beam 10; the latter being supported at intervals in its length for transverse adjustment on frame-mounted cross bars 11.

Secured on and depending from the beam 10 and laterally spaced apart a distance considerably less than the width of the belt 8 are skirts 12. These skirts terminate at their lower edges just short of the belt and—together with the beam 10—form a longitudinal fence or partition. At their forward ends, the skirts merge into a vertical-edged, lumber strip deflector 13 which projects ahead of the belt a short distance as shown in FIG. 1.

Mounted in connection with and spanning between the frame beams 5 and 6 on opposite sides of the belt 8—in spaced relation between the end frames 1 and 2—is a plurality of beams 14, disposed in equally angled V-array relative to the belt 8 which runs therebetween, as clearly shown in FIG. 3. Journaled in connection with the beams 5 and 6 are longitudinal upper and lower shafts 15 and 16, respectively; the upper shafts 15 being laterally out from the vertical frames 1 and 2 and below the transverse top beams 3 and 4, while the lower shafts 16 are a short distance below the level of the belt 8.

Mounted on each set of the shafts 15 and 16, immediately adjacent the various beams 14, are the top and bottom sprockets 17 of a row of lumber strip elevators in the form of endless chains 18 or the like. These endless chain elevators 18 are alined on each side and lengthwise of the apparatus, and the spaces adjacent the elevators are all covered by plates 19 supported on the different beams 14, 5, and 6; such plates 19 being substantially alined with the upper runs of said elevators 18 whereby lumber strip engaging cross cleats 20 on the elevators project outwardly from the plane of said plates.

The upper elevator shafts 15 are driven in unison and at the same speed by an electric motor unit 21 mounted on the rear top beam 4, and which unit is connected to said shafts 15 by endless chains 22; the motor unit 21 operating in a direction such that the upper runs of the elevators will move upwardly.

Lumber strips S, as advanced lengthwise and side by side onto the belt 8 from a saw, or from a preseparator unit as shown in copending application Ser. No. 612,413 (now Patent No. 3,401,785), are initially engaged and held slightly spread apart by a taper roller 23 mounted between arms 24 pivoted at their rear end on the beam 10 for swinging movement in a vertical plane. When the arms 24 are swung down, the taper roller 23 is in operative position and engages between a pair of advancing strips S in alignement with and a short distance ahead of the deflector 13, as shown in FIG. 1. If the use of the taper roller 23 is not necessary or desired at any time, the arms 24 may be swung up to an out-of-the-way position as shown in FIG. 2.

The advancing lumber strips S, shortly after being engaged by and passing on opposite sides of the deflector 13, are received on the belt 8; each strip almost immediately being engaged by a vertical-axis roller 25 disposed directly above said belt. Each such roller 25 is mounted on a horizontal arm 26 pivotally supported at its forward end on a spindle 27 journaled in connection with one side of the frame extension 7. The rollers 25 are normally but yieldably held against the adjacent skirt 12 by suitably arranged spring 28. Each lumber strip S, as it engages and passes the related roller 25, causes said roller to be deflected laterally out against the resistance of the spring 28; the resultant roller pressure on the strip holding the same against the adjacent skirt 12 as the strip advances and counteracting any tendency of the latter to continue from the deflector 13 in an angled path.

Downwardly sloping ramps 29 (which extend the full length of the belt 8 at the sides thereof) span from the level of the upper run of said belt to the elevators 18, as shown in FIG. 3.

When each lumber strip S has been moved for its full length onto the belt 8, such strip is automatically swept laterally off the belt and onto the related ramp 29 by the following mechanism:

Two longitudinal rows of relatively widely spaced, vertical shafts are mounted in the beam 10 on opposite sides of the center of width thereof; each row thus being disposed close to but behind a corresponding skirt 12. The shafts 30 of each row are journaled in the beam 10, as shown, and project both above and below the latter; each shaft extending downward—behind the corresponding skirt 12—nearly to the belt 8.

Figure 5:
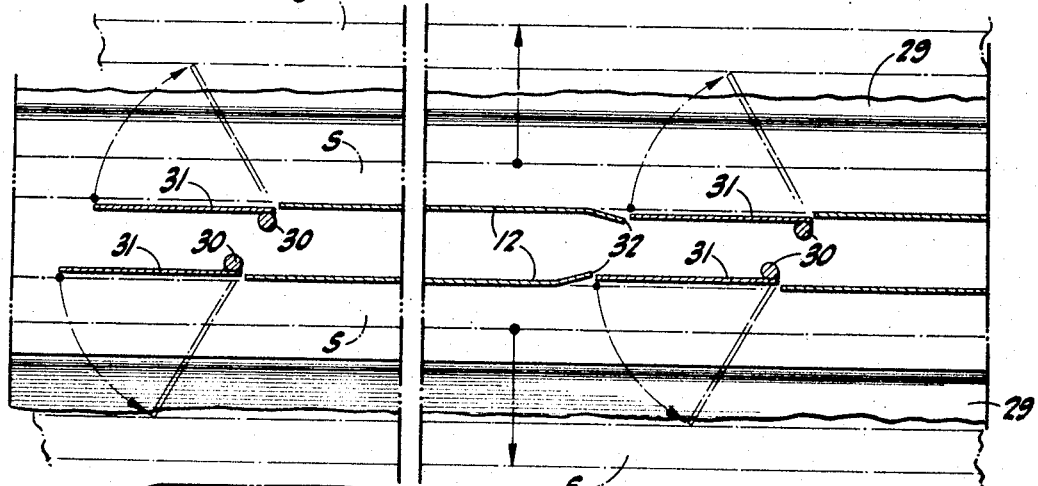
FIG. 5 is a fragmentary sectional plan taken on line 5—5 of FIG. 4.
Figure 6:
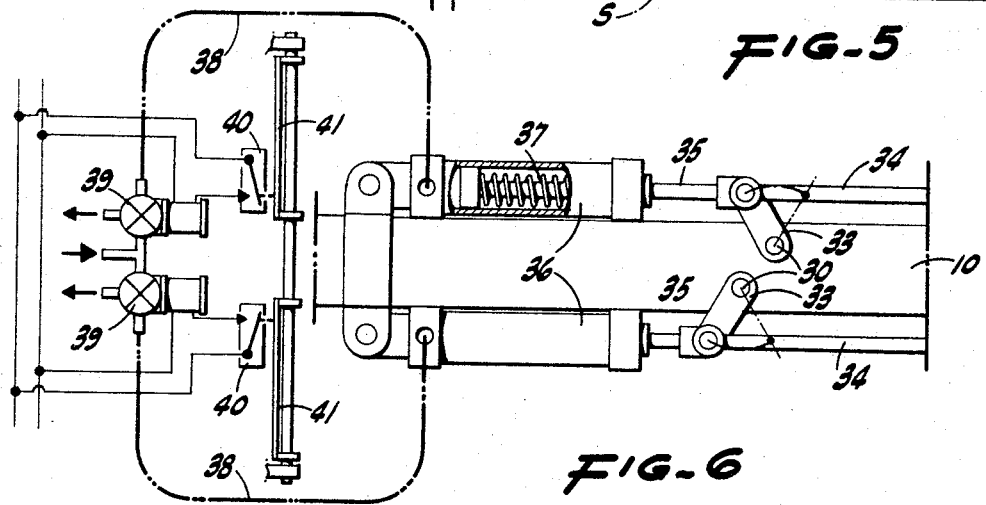
FIG. 6 is a fragmentary plan view of the operating means and control system for the lumber strip sweeping mechanism.

Secured on the shafts 30 below the beam 10 are rigid flipper plates or sweeps 31; these sweeps being disposed tangentially of the shafts 30 and normally extending lengthwise of the beam 10 and skirts 12. The adjacent skirt 12 is formed with openings 32 in front of the sweeps 31 in position to receive the same therethrough when the shafts 30 are rotated in a certain direction. To this end, all the shafts 30 of each row are provided on their upper ends with radial arms 33 which are parallel to each other, and all connected by rods 34. The arm 33 nearest the rear end of the beam 10 is pivoted to the piston rod 35 of a fluid pressure power cylinder 36 mounted on the beam 10; the piston rod 35 of said cylinder normally being held in a retracted position by suitable means such as a spring 37 in the cylinder. When the piston rod 35 is thus retracted, the radial arms 33 are angled rearwardly and the sweeps 31—while parallel to the adjacent skirt 12—project rearwardly from the shafts 30, as shown in FIG. 5.

Air under pressure is fed to the rear end of each power cylinder 36 from a supply pipe 38 having a normally closed solenoid valve 39 therein. The solenoid of each valve 39 is interposed in a circuit in which a normally open micro or similar switch 40 is interposed. This switch is mounted on the outside of the corresponding skirt 12 and includes a pivotally suspended switch-actuating member 41 extending transversely of and immediately adjacent the belt 8 for engagement by the forward end of a lumber strip advanced by said belt. As soon as either of the members 41 is thus engaged and moved slightly rearwardly by a lumber strip, the corresponding switch 40 is actuated and opens the related valve 39 whereupon air under pressure feeds to the power cylinder 36 and its piston rod 35 is quick-advanced to cause the connected shafts 30 to be rotated in a direction to swing the several attached sweeps 31 simultaneously out through the corresponding skirt openings 32. When this occurs the sweeps 31 engage and push the strip S laterally off the belt 8 and onto the ramp 29. The switch actuating force on the member 41 is then, of course, released and the solenoid valve 39 immediately returns to its normal closed, air exhausting position. This allows the spring 37 to retract the piston rod 35, which in turn will cause the sweeps 31 to be turned to a retracted or starting position behind the related skirt 12, ready for engagement with the next strip S being advanced on the same side of the fence or partition of the apparatus.

With the described arrangement, it is not necessary to maintain the lumber strips S in transverse alinement as they advance and each—upon striking the related switch actuating member 41—will trigger only the strip-sweeping mechanism on the same side of the aforesaid fence or partition of the apparatus.

As each lumber strip S is pushed onto the adjacent ramp 29, the strip slides down such ramp and onto the corresponding row of elevators 18, the cleats 20 of which engage and raise the strip to and over the top sprockets 17. The strip—and, of course, others to follow—then falls into and is cradled by a row of transverse slings 42. The slings 42 of each row (there being such a row on each side of the apparatus) are each detachably supported at the laterally inner end on a hook 43 projecting from the upper beam 5, and at the laterally outer and such slings are wound on a drum 44 fixed on a shaft 45 journaled on and extending between the top beams 3 and 4. The shaft 45 is driven when desired by a suitable, manually controlled, reversible electric motor unit 46 mounted on the rear top beam 4.

By reason of this arrangement, the slings 42—as they progressively become loaded—may be lowered to a corresponding extent by controlled rotation of the shaft 45 and drums 44 in a sling unwrapping direction. See FIGS. 2 and 3. With lowering the slings from one side there is a tendency—desirably—to roll the cradled lumber strips S so that they become straight relative to the pallet or truck therebelow. When the slings 42 have been lowered until the load of lumber strips S rests on the pallet or truck the slings are disengaged from the hooks 43 and pulled out from under the load. The shaft 45 is then rotated in a direction to wrap or rewind the slings onto the drums 44 to starting length; the slings also being re-engaged with said hooks 43.

As the described lumber strip sweeping and elevating mechanism are duplicated on both sides of the apparatus, and function independently of each other, both sets of slings can be loaded at the same time; each set of slings always receiving the corresponding one of the initially side-by-side strips as fed to and advanced by the belt 8.

Should shorter than full-length strips be handled in the apparatus, other switches, not shown but generally the same as the switches 40, may be mounted on the skirts 12 in an advanced position for actuation by such shorter strips once they are fully disposed on the belt; such other switches, of course, controlling the valves 39 in the same fashion as previously described.

At times the side-by-side lumber strips may be of different relative widths so that the longitudinal saw line between such strips would—in the absence of adjustment means on the apparatus—be laterally offset relative to the taper roller 23 and the leading edge of the deflector 13. In order that said taper roller 23 and deflector 13 can be adjusted to align the same with said longitudinal saw line between the side-by-side lumber strips, transverse manually adjustable screw rods 47 are mounted against longitudinal movement in the end frames 1 and 2 and threaded through beam 10 so that, upon rotation of such screw rods, the beam 10 and all parts connected thereto can be adjusted laterally relative to the belt 8 to the necessary extent.

From the foregoing description, it will be readily seen that there has been produced such a lumber strip off-bearer and loader as substantially fulfills the objects of the invention, as set forth herein.

I claim:

1. A lumber strip off-bearer and loader comprising a substantially horizontal driven conveyor belt onto one end of which lumber strips are fed in succession lengthwise of the belt for conveyance thereby toward the opposite end of the belt, mechanism associated with the belt and functioning automatically upon the strips being disposed in their entirety on the belt to then sweep the strips laterally off said belt, an elevator unit extending in width lengthwise of the belt and in length sloping laterally outward and upward from its lower to its upper end in position to receive and lift swept-off lumber strips in succession and discharge the same from the upper end of the elevator unit, and means disposed laterally out from and below the upper end of the elevator unit to receive and assemble a plurality of lumber strips as successively discharged from said upper end of the elevator unit; said last named means comprising a plurality of slings spaced lengthwise of the apparatus and extending transversely relative thereto, means detachably supporting the slings at one end, rotatable drums about which the slings at their opposite end are wrapped, and manually controlled means to simultaneously rotate the drums in a selected direction.

2. A lumber strip off-bearer and loader comprising a substantially horizontal driven conveyor belt onto one end of which lumber strips are fed in succession lengthwise of the belt for conveyance thereby toward the opposite end of the belt, and mechanism associated with the belt and functioning automatically upon the strips being disposed in their entirety on the belt to then sweep the strips laterally off said belt; there being a partition upstanding from and extending lengthwise of the belt intermediate the side edges thereof and along which partition the strips ride when advancing on the belt, and said mechanism comprising longitudinally spaced upstanding sweeps normally behind the partition, the latter having openings to receive the sweeps therethrough, means pivoting the sweeps at one end in connection with the partition, power means placed in operation by each strip upon the arrival of such strip at a predetermined point in the length of the belt, and power means actuated connections between said power means and sweeps arranged to swing the latter outwardly through the respective openings to engage the strip and sweep the same off the belt.

3. Apparatus, as in claim 2, in which said power means comprises a normally inactive fluid pressure actuated power cylinder, a fluid pressure supply pipe leading to said cylinder and having a normally closed valve therein, an electric device to open the valve including a normally open switch, and a movable element arranged to close the switch; said movable element overlying the belt and projecting into the path of the advancing strip.

4. A lumber strip off-bearer and loader comprising a substantially horizontal driven conveyor belt onto one end of which side-by-side lumber strips are fed, a partition extending lengthwise of and upstanding from the belt and along opposite sides of which the strips ride when on the belt, a deflector on the forward end of the partition adapted to enter between the strips whereby said strips pass on opposite sides of said deflector, mechanism associated with the partition and functioning automatically upon each strip being disposed in its entirety on the belt to then sweep such strip off the corresponding side of the belt.

5. Apparatus, as in claim 4, including downwardly and outwardly sloping ramps at the sides of the belt, the strips as swept from the belt being received on and sliding down the ramps, corresponding upwardly and outwardly inclined elevators extending from adjacent the ramps and adapted to successively receive strips therefrom, the elevators lifting the strips and discharging the same from the upper ends of said elevators, and means disposed in position to receive and assemble a plurality of strips as so discharged.

6. Apparatus, as in claim 4, including a taper roller mounted in connection with the partition and projecting ahead of and alined with the deflector; said taper roller engaging between and initially separating the advancing lumber strips.

7. Apparatus, as in claim 6, with means to laterally adjust the partition relative to the belt.

References Cited

UNITED STATES PATENTS

| 1,241,525 | 10/1917 | Leatherbee | 198—24 X |
| 1,961,661 | 6/1934 | Fuller | 198—24 X |
| 2,768,756 | 10/1956 | Horman | 198—21 X |

FOREIGN PATENTS

| 1,208,238 | 12/1965 | Germany. |
| 1,030,355 | 5/1966 | Great Britain. |

EDWARD S. SROKA, *Primary Examiner.*

U.S. Cl. X.R.

214—6